UNITED STATES PATENT OFFICE.

STEPHEN H. EMMENS, OF LONDON, ENGLAND.

PROCESS OF MAKING FERRIC SULFATE.

SPECIFICATION forming part of Letters Patent No. 543,002, dated July 23, 1895.

Application filed March 29, 1894. Renewed December 22, 1894. Serial No. 532,724. (No specimens.)

*To all whom it may concern:*

Be it known that I, STEPHEN H. EMMENS, a subject of the Queen of Great Britain, and a resident of London, England, temporarily residing at San Francisco, in the county of San Francisco and State of California, have invented a new and useful Improvement in the Manufacture of Ferric-Sulfate Solution, of which the following is a specification.

This invention relates to the manufacture of ferric-sulfate solution; and it consists in the process substantially as hereinafter described, and set forth in the claims.

I have by experiment discovered that if a mixture of sulfurous anhydrid ($SO_2$) and air be passed into water containing ferric hydrate in suspension a chemical reaction takes place, whereby the $SO_2$ becomes oxidized and combines with the ferric hydrate to form ferric sulfate, the equations representing such reaction being as follows:

1. $Fe_2O_3 + 3SO_2 + 3O = Fe_2(SO_4)_3$.

2. $2Fe_2O_3 + 5SO_2 + 4O = Fe_2(SO_4)_3 + 2FeSO_4$.

3. $2FeSO_4 + SO_2 + 2O = Fe_2(SO_4)_3$.

The first of these equations is, it will be observed, the equivalent of the other two, and in practice part of the ferric sulfate appears to be formed direct, as in equation No. 1, while part appears to be the result of an intermediate production and subsequent oxidation of ferrous sulfate, as in equations Nos. 2 and 3.

The reaction thus explained is availed of in my invention, which I carry into effect as follows: In any suitable vessel or apparatus—such as, for example, an open vat—I place water having ferric hydrate in suspension. The ferric hydrate may be obtained and mixed with the water in any convenient manner—such as, for example, by stirring up or agitating the precipitated ferric hydrate produced in the leaching-vats employed in my process for the treatment of zinc-lead sulfids, for which United States Patent No. 513,490 has been granted to me. The water need not be pure, but may have metallic salts in solution—such as, for example, is the case with the liquor in the aforesaid leaching-vats. Into the water having ferric hydrate in suspension I introduce sulfurous anhydrid and air, either separately or together. I, however, prefer to introduce them mixed together. This gaseous mixture may be obtained in any convenient manner, but when operations on a large scale are desired the preferable sources are, first, the roasting of sulfureted ores, and, secondly, the calcination of metallic sulfates. If such roasting or calcination take place in an ordinary reverberatory or other suitable furnace, the issuing gases will be largely composed of sulfurous anhydrid and air, and may, by means of an ordinary air-pump, fan, condensation-tower, tromp, or other suitable apparatus, be intercepted and led or forced into the water having ferric hydrate in suspension. The above-mentioned chemical reaction then takes place and a solution of ferric sulfate is produced. Generally speaking, the solution will contain more or less ferrous sulfate; but as for many purposes its presence is an advantage rather than a detriment, it can remain. In special cases the ferrous component may be peroxidized. This solution is then available for use in the arts—such as, for example, in the treatment of zinc-lead sulfids by the method I have patented, as aforesaid.

In cases where a condensation-tower or equivalent apparatus is employed for intercepting the furnace-gases, the issuing aqueous solution of sulfurous anhydrid may be used as or added to the water in which the ferric hydrate is suspended, and the required air may be separately blown into the fluid.

Having thus described the said process, I claim as my invention and desire to patent under this specification—

1. The method of manufacturing ferric sulfate, which method consists in bringing sulfurous anhydrid and air into contact with ferric hydrate and water.

2. The method of manufacturing ferric sulfate, which method consists in passing the gases from a sulfuret or sulfate roasting or calcining furnace into water in which ferric hydrate is suspended.

STEPHEN H. EMMENS.

Witnesses:
C. H. PHILLIPS,
NEWTON W. EMMENS.